US011937257B2

(12) United States Patent
Yang et al.

(10) Patent No.: US 11,937,257 B2
(45) Date of Patent: Mar. 19, 2024

(54) UPLINK CONFIGURED GRANT RELEASE AND REACTIVATION

(71) Applicant: QUALCOMM Incorporated, San Diego, CA (US)

(72) Inventors: Wei Yang, San Diego, CA (US); Seyedkianoush Hosseini, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/398,957

(22) Filed: Aug. 10, 2021

(65) Prior Publication Data

US 2022/0053549 A1 Feb. 17, 2022

Related U.S. Application Data

(60) Provisional application No. 63/064,368, filed on Aug. 11, 2020.

(51) Int. Cl.
*H04W 72/14* (2009.01)
*H04W 72/23* (2023.01)
*H04W 76/19* (2018.01)
*H04W 76/38* (2018.01)

(52) U.S. Cl.
CPC ......... *H04W 72/23* (2023.01); *H04W 76/19* (2018.02); *H04W 76/38* (2018.02)

(58) Field of Classification Search
None
See application file for complete search history.

(56) References Cited

FOREIGN PATENT DOCUMENTS

| WO | 2020067515 A1 | 4/2020 | |
|---|---|---|---|
| WO | 2020069359 A1 | 4/2020 | |
| WO | WO-2020067515 A1 * | 4/2020 | ........... H04L 1/0061 |

OTHER PUBLICATIONS

International Search Report and Written Opinion—PCT/US2021/045609—ISA/EPO—dated Dec. 1, 2021.

* cited by examiner

*Primary Examiner* — Kouroush Mohebbi
(74) *Attorney, Agent, or Firm* — Procopio, Cory, Hargreaves & Savitch LLP

(57) ABSTRACT

A user equipment (UE) receives a configuration of a set of parameters for an uplink configured grant for uplink transmission. The UE receives a release or a reactivation of the uplink configured grant. The UE and releases or reactivates transmission occasions of the uplink configured grant that occur after reception of the release or the reactivation by at least a processing time duration.

32 Claims, 12 Drawing Sheets

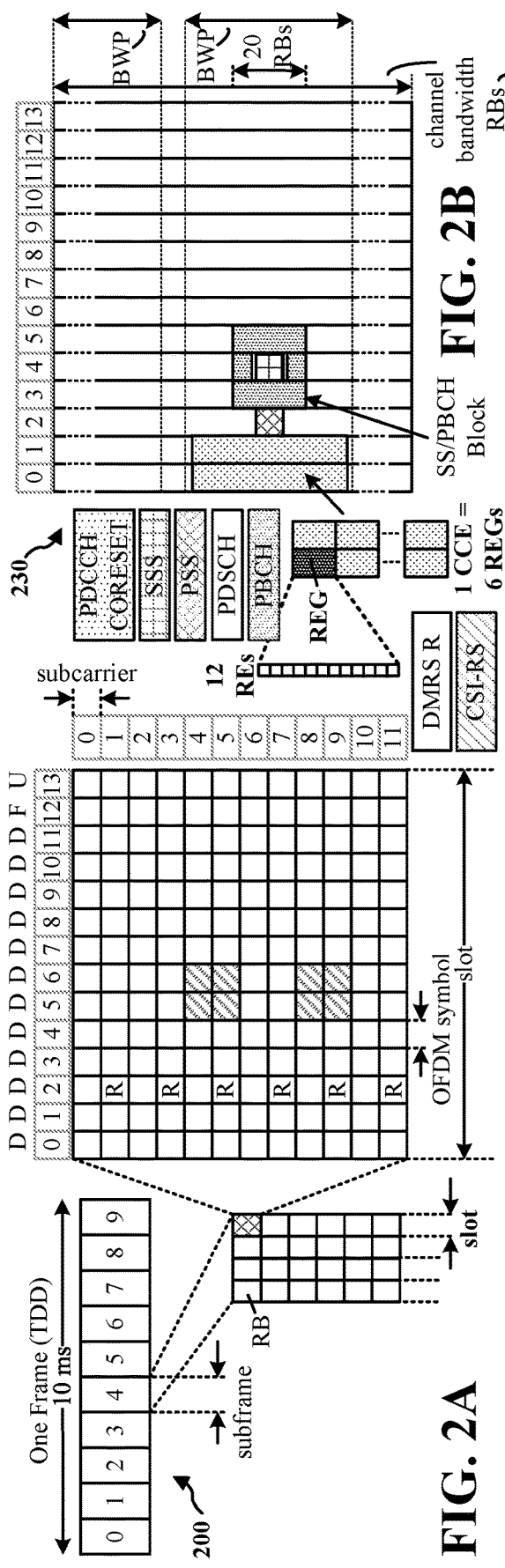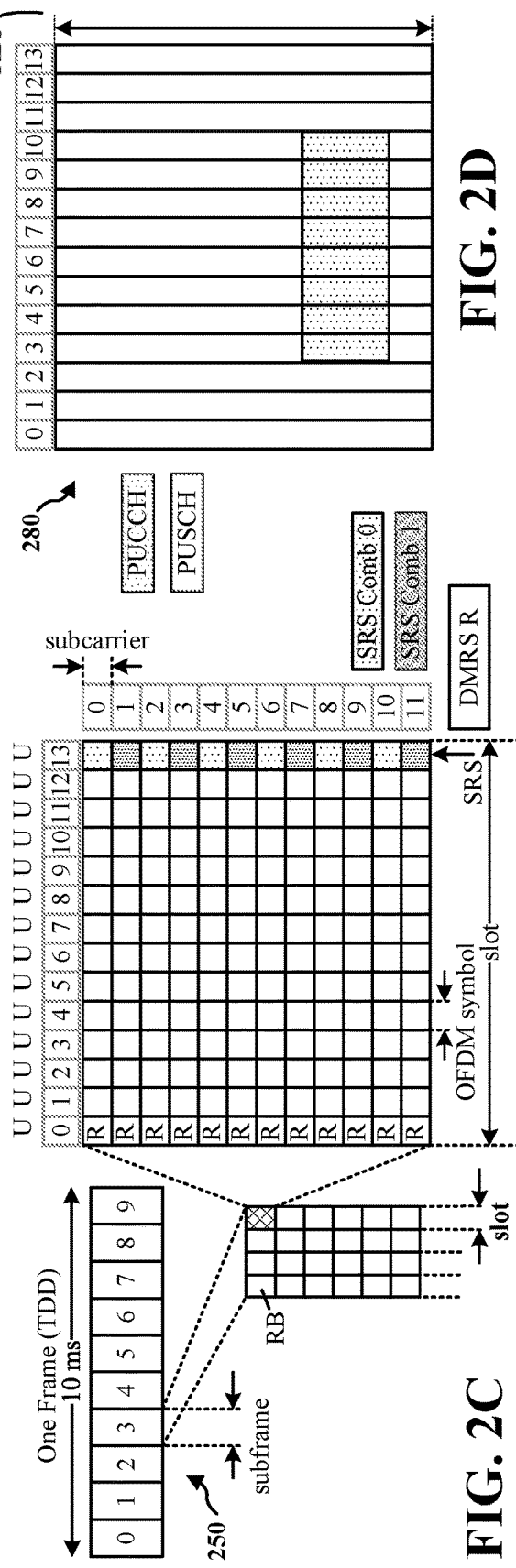

UPLINK CONFIGURED GRANT RELEASE AND REACTIVATION

CROSS REFERENCE TO RELATED APPLICATION(S)

This application claims the benefit of and priority to U.S. Provisional Application Ser. No. 63/064,368, entitled "Type 2 Uplink Configured Grant Release and Reactivation" and filed on Aug. 11, 2020, which is expressly incorporated by reference herein in its entirety.

TECHNICAL FIELD

The present disclosure relates generally to communication systems, and more particularly, to a wireless communication including resources allocated for uplink transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives a configuration of a set of parameters for an uplink configured grant for uplink transmission. The apparatus receives a release or a reactivation of the uplink configured grant. The apparatus releases or reactivates transmission occasions of the uplink configured grant that occur after reception of the release or the reactivation by at least a processing time duration.

In an aspect of the disclosure, a method, a computer-readable medium, and an apparatus are provided for wireless communication at a base station. The apparatus transmits, to a UE, a configuration of a set of parameters for an uplink configured grant for uplink transmission. The apparatus transmits a release or a reactivation of the uplink configured grant. The apparatus determines that the UE will not apply the release or the reactivation in a transmission occasion of the uplink configured grant based on the transmission occasion occurring within a processing time after the release or the reactivation.

In an aspect of the disclosure, a method, a computer-readable medium, and an apparatus are provided for wireless communication at a base station. The apparatus transmits, to a UE, a configuration of a set of parameters for an uplink configured grant for uplink transmission. The apparatus transmits a release or a reactivation of the uplink configured grant at least a processing time duration prior to a transmission occasion of the uplink configured grant.

In an aspect of the disclosure, a method, a computer-readable medium, and an apparatus are provided for wireless communication at a UE. The apparatus receives a configuration of a set of parameters for an uplink configured grant for uplink transmission. The apparatus receives a release or a reactivation of the uplink configured grant within a processing time duration prior to a transmission occasion of the uplink configured grant. The apparatus identifies that a scheduling error has occurred based on receiving the release or the reactivation of the uplink configured grant within the processing time duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
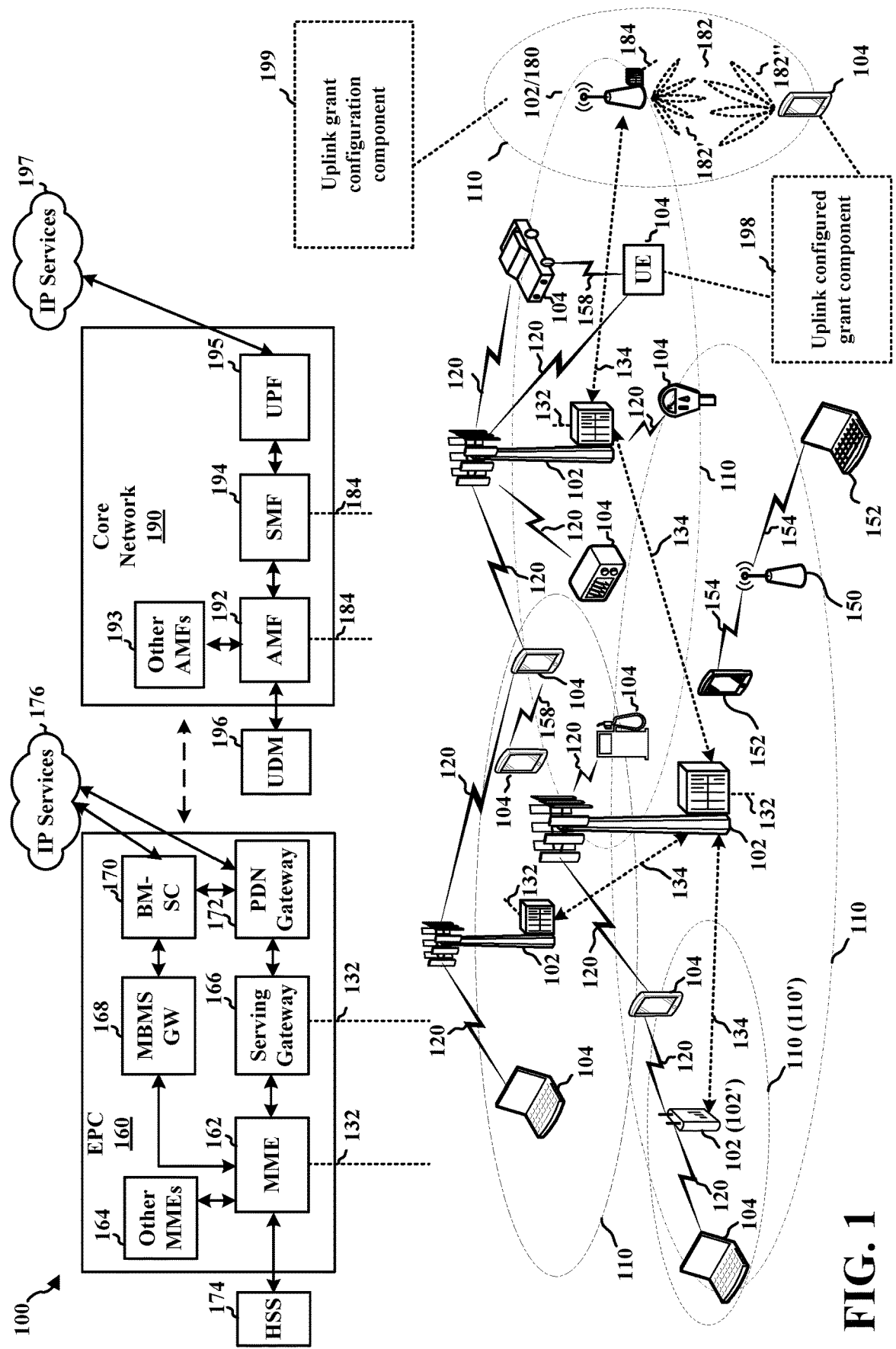
FIG. 1 is a diagram illustrating an example of a wireless communications system and an access network.

A base station may configure a UE for recurring or periodic resources for uplink transmissions, e.g., physical uplink shared channel (PUSCH) transmissions by the UE. The configuration may be referred to as an uplink configured grant, and the uplink transmission may be referred to as an uplink configured grant transmission. The PUSCH transmissions may be referred to as grant-free PUSCH transmissions, because the UE may transmit the PUSCH without a dynamic grant of resources. The uplink configured grant resources may be configured for the UE in RRC signaling, for example, whereas other uplink resources may be allocated in more dynamic signaling, such as DCI.

The base station may transmit an activation, deactivation, reactivation, or release for the periodic resources. After receiving an uplink configured grant release in a physical downlink control channel (PDCCH), the UE may not use the uplink configured grant resources. After the UE receives a reactivation PDCCH, the base station may indicate for the UE to use a new set of resources and to release the previous resources.

Due to processing time requirements at the UE, if the uplink configured grant release is received near a starting time of a transmission occasion of the uplink configured grant, the UE may not decode the PDCCH in time to determine the release and to stop a PUSCH transmission in the transmission occasion of the uplink configured grant. Aspects presented herein provide a timeline for the UE to apply an activation, deactivation, reactivation, or release of the periodic resources based on a processing time duration following the signaling of the activation, deactivation, reactivation, or release. The timeline presented herein helps to avoid miscommunication between the UE and the base station for uplink configured grant activation, release, deactivation, or reactivation. Aspects provide for a base station to transmit signaling of the activation, deactivation, reactivation, or release to the UE based on the processing time duration, e.g., at least the processing time duration prior to a transmission occasion corresponding to the activation, deactivation, reactivation, or release. Aspects further provide for a base station to determine whether a UE has received signaling of an activation, deactivation, reactivation, or release based on transmissions from the UE following a processing time duration. Aspects provide for a UE to identify that a scheduling error has occurred based on receiving the release or the reactivation of the uplink configured grant within a processing time duration.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz).

Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an uplink configured grant component 198 that is configured to receive a configuration of a set of parameters for an uplink configured grant for uplink transmission and to release or reactivate transmission occasions of the uplink configured grant that occur after reception of the release or the reactivation by at least the processing time duration. In some aspects, the uplink configured grant component 198 may be configured to receive a release or a reactivation of the uplink configured grant within a processing time duration prior to a transmission occasion of the uplink configured grant and identify that a scheduling error has occurred based on receiving the release or the reactivation of the uplink configured grant within the processing time duration.

The base station 102 or 180 may include an uplink grant configuration component 199 configured to transmit, to a UE, a configuration of a set of parameters for an uplink configured grant for uplink transmission, transmit a release or a reactivation of the uplink configured grant, and determine that the UE will not apply the release or the reactivation in a transmission occasion of the uplink configured grant based on the transmission occasion occurring within a processing time after the release or the reactivation. In some aspects, the uplink grant configuration component 199 may be configured to transmit, to a UE, a configuration of a set of parameters for an uplink configured grant for uplink transmission, and transmit a release or a reactivation of the uplink configured grant at least a processing time duration prior to a transmission occasion of the uplink configured grant.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether cyclic prefix (CP) is normal or extended. For normal CP, each slot may include 14 symbols, and for extended CP, each slot may include 12 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (e.g., 14 symbols), different numerologies μ 0 to 4 allow for 1, 2, 4, 8, and 16 slots, respectively, per subframe. For extended CP, to the numerology 2 allow for 4 slots, respectively, per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
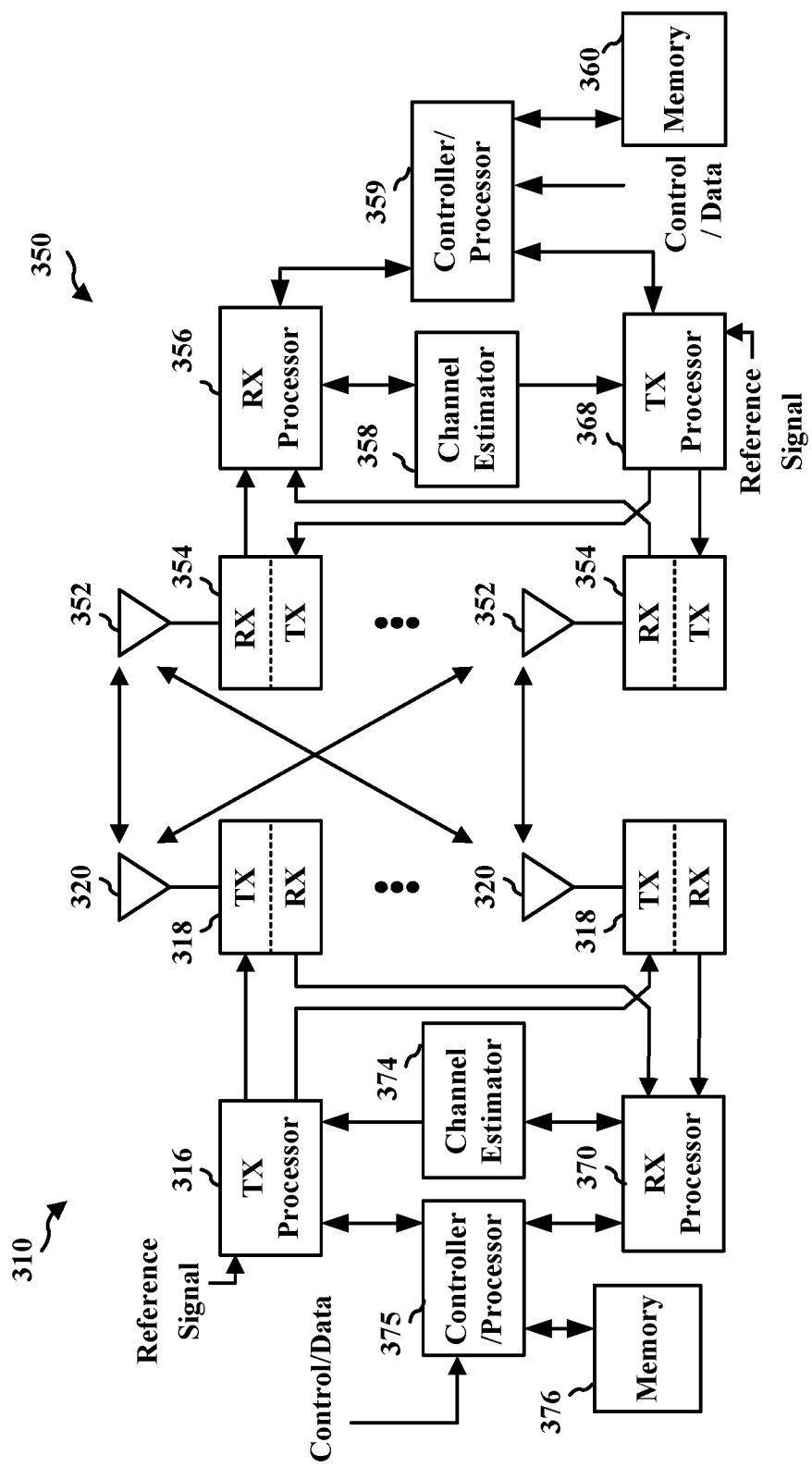
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the uplink configured grant component of FIG. 1.

At least one of the TX processor 316, the RX processor 370, and the controller/processor 375 may be configured to perform aspects in connection with the uplink grant configuration component 199 of FIG. 1.

A base station may configure a UE for recurring or periodic resources for uplink transmissions, e.g., PUSCH transmissions by the UE. The configuration may be referred to as an uplink configured grant, and the uplink transmission may be referred to as an uplink configured grant transmission. The PUSCH transmissions may be referred to as grant-free PUSCH transmissions, because the UE may transmit the PUSCH without a dynamic grant of resources. The uplink configured grant resources may be configured for the UE in RRC signaling, for example, whereas other uplink resources may be allocated in more dynamic signaling, such as DCI.

In a first type of uplink configured grant, the base station may configure the parameters for the PUSCH transmissions, e.g., all of the parameters for the uplink configured grant. The UE may use the configured resources without a further activation from the base station. The first type of uplink configured grant may be referred to as a "Type 1" uplink configured grant.

In a second type of uplink configured grant, the base station may configure the grant with a set of transmission parameters. The base station may then activate the configured set of parameters. The UE may wait until an activation is received before using the configured resources for PUSCH transmissions. The second type of uplink configured grant may be referred to as a "Type 2" uplink configured grant.

Figure 4:
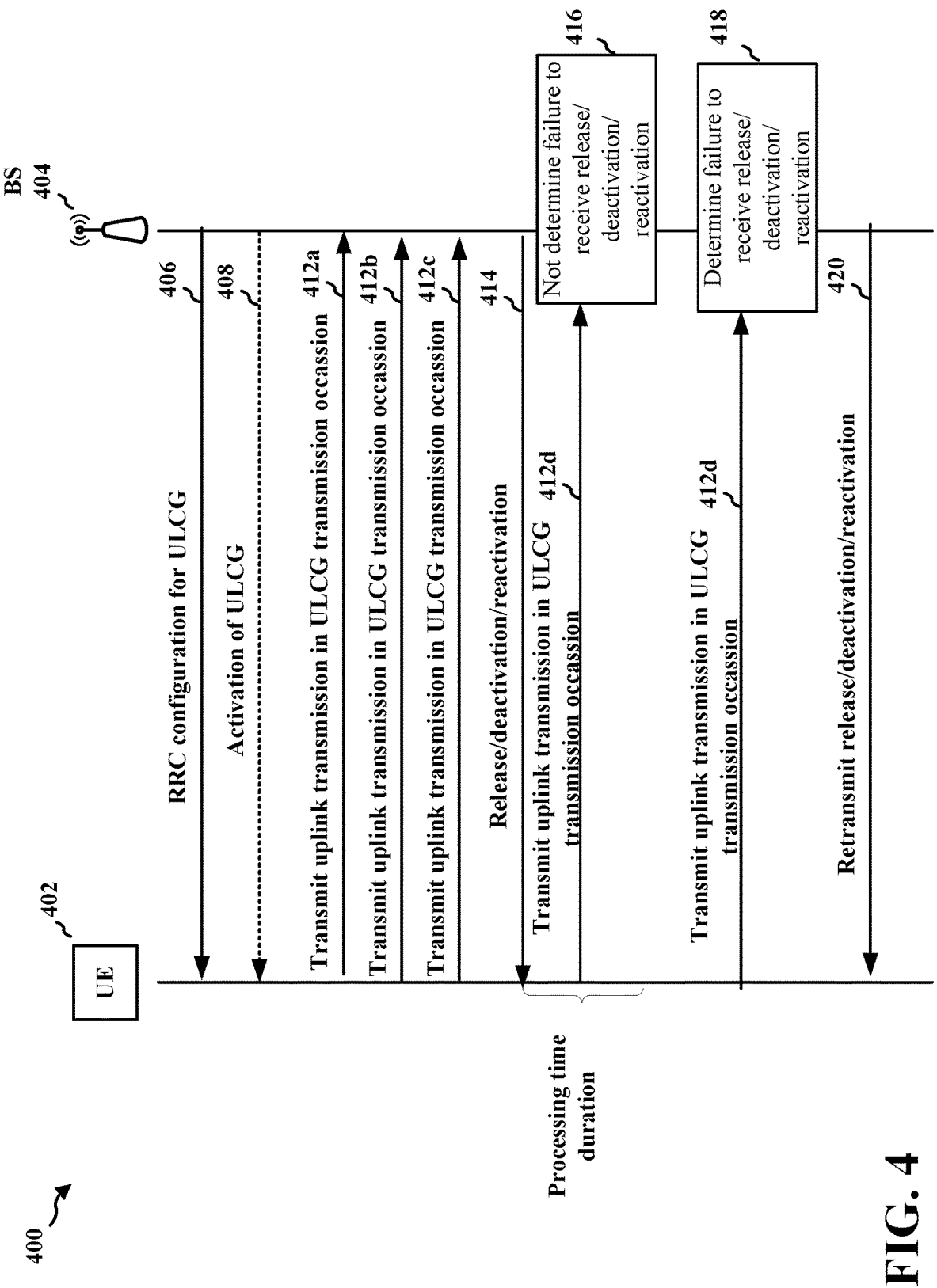
FIG. 4 illustrates an example communication flow diagram between a UE and a base station that includes a timeline for a release or reactivation of an uplink configured grant.

FIG. 4 illustrates a communication flow diagram 400 showing wireless communication between a UE 402 and a base station 404 including the configuration of uplink configured grant (ULCG) resources for the UE 402. The UE 402 may correspond to the UE 104 and/or the UE 350 in FIG. 1 or FIG. 3. The base station 404 may correspond to the base station 102, 180, or 310 in FIG. 1 or FIG. 3. As illustrated at 406, the base station may transmit a configuration the ULCG resources for the UE 402, e.g., in RRC signaling. If the ULCG is a Type 2 ULCG, at 408, the base station 404 may further activate the ULCG that was configured at 406. If the ULCG is a Type 1 ULCG, the UE 402 may use the ULCG resources to transmit uplink transmissions without a further activation. After receiving the configuration 406 and/or activation 408, the UE 402 may transmit uplink transmissions 412a, 412b, 412c in the transmission occasions of the ULCG.

After configuration and/or activation, the base station may later deactivate the configured set of parameters. For example, FIG. 4 illustrates that the base station 404 may transmit a release, deactivation, or reactivation, e.g., 414, of the ULCG to the UE 402. In response to receiving a deactivation, the UE 402 may stop using the configured set of parameters for PUSCH transmissions. The base station 404 may later reactivate the configured set of parameters, and the UE 402 may resume PUSCH transmissions using the uplink configured grant. If the base station 404 releases the configured set of parameters, and the UE 402 may stop using the configured set of parameters in response to receiving the release.

The UE 402 may receive the deactivation/reactivation/release, e.g., 414, in PDCCH from the base station 404, e.g., in DCI. After receiving an uplink configured grant release PDCCH, the UE 402 may not use the uplink configured grant resources. After the UE 402 receives a reactivation PDCCH, the base station 404 may indicate for the UE 402 to use a new set of resources and to release the previous resources.

Figure 5:
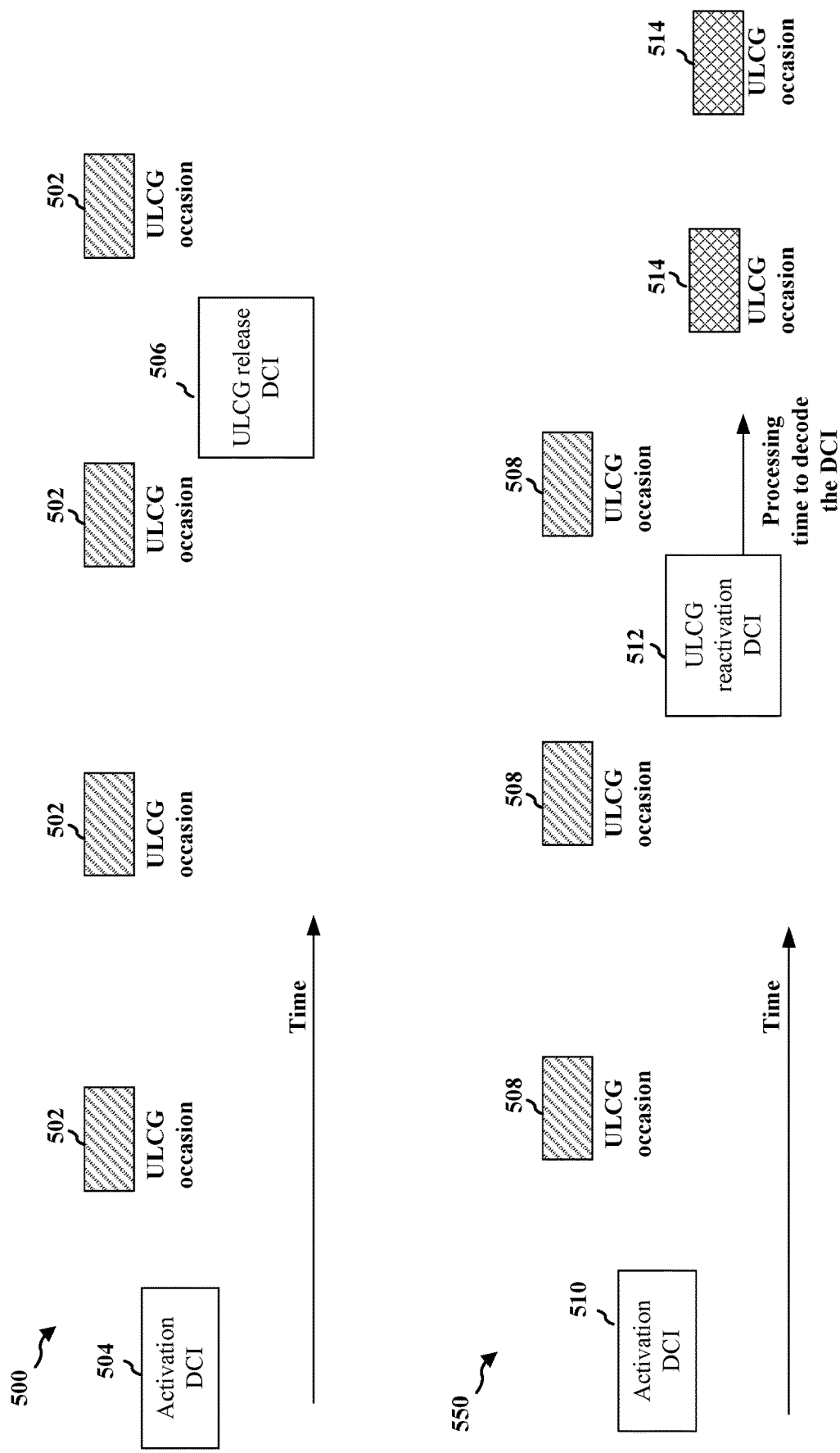
FIG. 5 illustrates an example release and reactivation of an uplink configured grant.

Due to processing time requirements at the UE 402, if the uplink configured grant release is received near a starting time of a transmission occasion of the uplink configured grant, the UE 402 may not decode the PDCCH in time to determine the release and to stop a PUSCH transmission in the transmission occasion of the uplink configured grant. FIG. 5 illustrates an example 500 of an uplink configured grant that provides periodic uplink resources, e.g., an ULCG occasions 502, for a UE (such as the UE 402) to transmit PUSCH. The UE receives a PDCCH transmission 504 activating the ULCG, and the UE may transmit PUSCH in the ULCG occasions 502. The UE receives PDCCH 506 releasing the ULCG. However, if there is not enough time before the next ULCG occasion 502, the UE may transmit PUSCH after receiving the ULCG release, e.g., PDCCH 506, and before decoding the ULCG release. The base station may misinterpret the PUSCH transmission at 502 to mean that the UE did not receive the ULCG release PDCCH 506.

If the uplink configured grant reactivation is received near a starting time of a transmission occasion of the uplink configured grant, the UE may not decode the PDCCH and determine the reactivation in time to transmit PUSCH in the activated transmission occasion. The base station may determine that the PDCCH was not correctly received by the UE based on the continued transmission of PUSCH by the UE in the transmission occasion of the released uplink configured grant. The base station may determine that the PDCCH was not correctly received by the UE the UEs failure to use a transmission occasion of a reactivated uplink configured grant. FIG. 5 illustrates an example 550 of a UE receiving an activation DCI 510 that activates SPS resources for ULCG occasions 508. The UE later receives an ULCG reactivation DCI 512 that activates different parameters for ULCG occasions 514. However, if there is not enough time before the next ULCG occasion 508, the UE may still transmit PUSCH using the prior parameters after receiving the ULCG reactivation DCI 512. The base station may misinterpret the PUSCH transmission at 508 to mean that the UE did not receive the ULCG reactivation DCI 512.

Aspects presented herein provide an improved timeline that helps to avoid miscommunication between the UE 402 and the base station 404 for uplink configured grant release, deactivation, or reactivation, e.g., 414. Aspects may also be applied for an uplink configured grant activation. A processing time parameter (e.g., T) may be used by a UE and/or a base station in connection with an ULCG release or an ULCG reactivation. T may include an amount of symbols, for example. In other aspects, T may correspond to a duration of time that has a unit different than a number of symbols.

For an activated type 2 ULCG configuration, the UE may release a Type 2 ULCG occasion if the PDCCH carrying the Type 2 ULCG release/reactivation DCI (i.e., the ending symbol) is received at a time at least T (T being the processing time duration) before the earliest starting symbol of the ULCG transmission occasion. If the Type 2 ULCG release/reactivation DCI is received within a time period of T before the ULCG transmission, the UE may transmit the PUSCH in the ULCG transmission occasion, as shown at 412*d*.

The UE 402 may not be expected to cancel an ULCG occasion if the release/reactivation DCI is received within T time from the earliest starting symbol of ULCG. If the base station 404 receives PUSCH in an ULCG transmission occasion within T of transmitting the release/reactivation, the base station 404 may not determine that the UE 402 failed to receive the release/reactivation, e.g., as illustrated at 416. If the base station 404 receives PUSCH in a transmission occasion of the prior ULCG configuration at least T after transmitting the release/reactivation, e.g., as at 412*e*, the base station 404 may determine that the UE 402 did not receive the release or reactivation and may retransmit the release or reactivation, e.g., as illustrated at 418. The base station 404 may take an action in response to detecting the UE's failure to receive the release, deactivation, reactivation, etc. by retransmitting the release, deactivation, reactivation, at 420.

Alternatively, the UE 402 may not expect to be scheduled by a PDCCH to release or reactivate an ULCG configuration, if the ending symbol of the PDCCH is within T time from the starting symbol of a ULCG occasion associated with the ULCG configuration. The base station 404 may transmit a ULCG release/reactivation, e.g., 414, at least T time prior to the next ULCG transmission occasion or the ULCG transmission occasion, e.g., 412*e*, to which the ULCG release/deactivation/reactivation is intended to apply. The UE 402 may determine a scheduling error if the UE 402 receives a release/retransmission within a period T prior to the ULCG transmission occasion.

Figure 6:
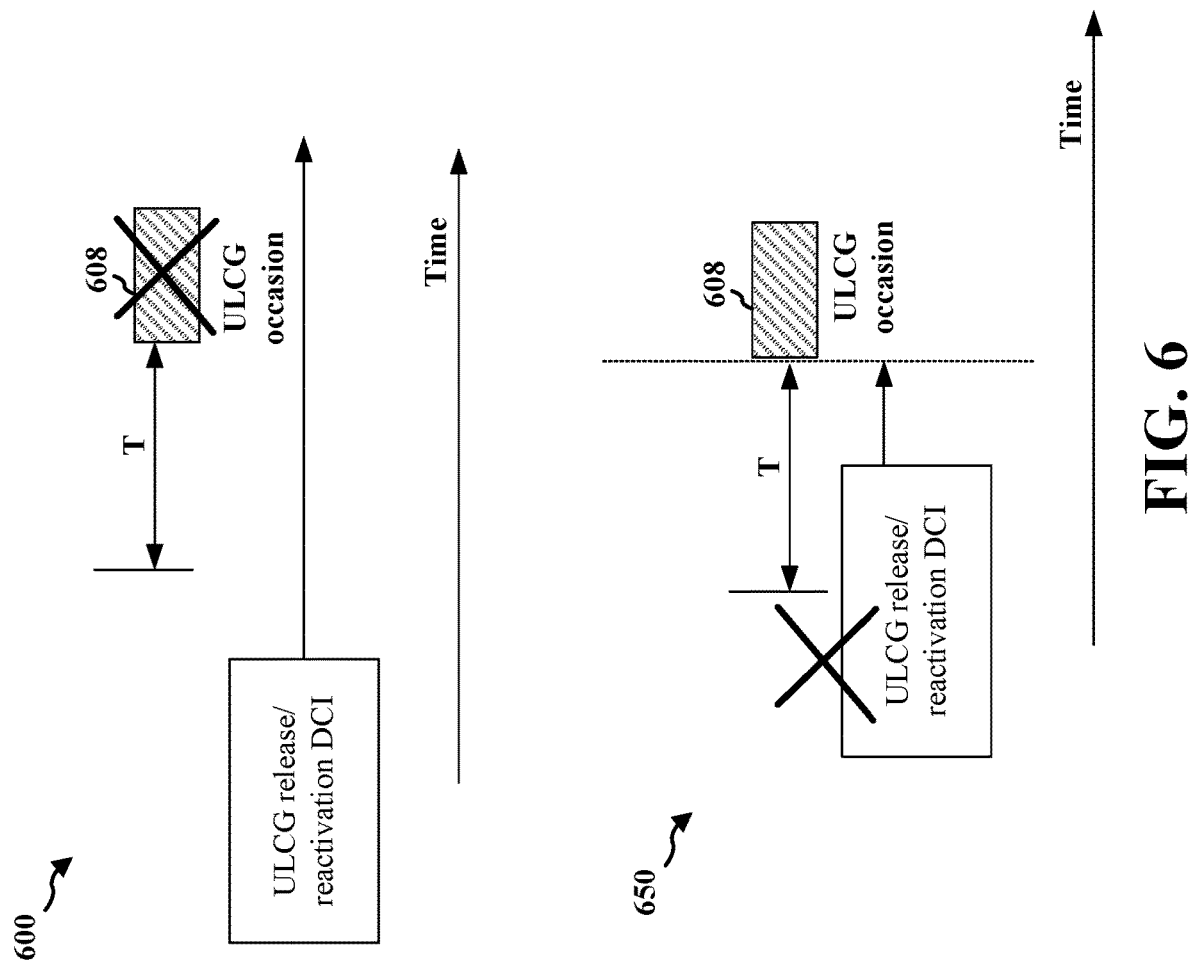
FIG. 6 illustrates an example release and reactivation of an uplink configured grant relative to a processing time parameter.

FIG. 6 illustrates an example 600 in which the UE (such as the UE 402) receives a PDCCH from the base station (such as the base station 404) indicating a release or a reactivation for the ULCG that is received more than a time T prior to the ULCG occasion. Therefore, the UE may release the ULCG or reactivate the ULCG prior to the ULCG occasion and may not transmit PUSCH in the ULCG occasion. For example, if the indication is a reactivation, the UE may transmit the next PUSCH in the reactivated ULCG, or using the parameters of the reactivation. In the example 650, the UE end of the PDCCH that indicates the release or reactivation is less than the time T before the ULCG occasion 608. The UE may transmit PUSCH in the ULCG occasion or may not cancel a PUSCH transmission in the ULCG occasion.

In both aspects above, if the ULCG release DCI releases multiple Type 2 ULCG configurations, then all of the ULCG occasions corresponding to the multiple Type 2 ULCG configurations may satisfy the timeline condition T. In the first example, the UE may apply the combined release/reactivation to each of the multiple ULCG configurations after the period T. For example, if a transmission occasion for one ULCG configuration occurs within the period T following the release/reactivation, the UE may transmit PUSCH for that transmission occasion or does not cancel a PUSCH transmission in the transmission occasion.

T may be based on $N_2$ symbols. For example, T may equal $N_2$ symbols. T may be based on $T_{proc,2}$. For example, T may be equal to $T_{proc,2}$. If the first uplink symbol in the PUSCH allocation for a transport block, including the DM-RS, as defined by a slot offset $K_2$ and the start and length indicator (SLIV) of the scheduling DCI and including the effect of the timing advance, that is no earlier than at symbol $L_2$, where $L_2$ is defined as the next uplink symbol with its CP starting $T_{proc,2} = \max((N_2 + d_{2,1} + d_2)(2048 + 144) \cdot \kappa 2^{-\mu} \cdot T_C + T_{ext} + T_{switch}, d_{2,2})$ after the end of the reception of the last symbol of the PDCCH carrying the DCI scheduling the PUSCH, then the UE shall transmit the transport block. Table 1 and Table 2 illustrate examples of PUSCH preparation time ($N_2$) to illustrate the concept. As illustrated in the tables, the PUSCH preparation time may be based on subcarrier spacing (O.

TABLE 1

PUSCH preparation time for PUSCH timing capability 1

| μ | PUSCH preparation time $N_2$ [symbols] |
|---|---|
| 0 | 10 |
| 1 | 12 |
| 2 | 23 |
| 3 | 36 |

TABLE 2

PUSCH preparation time for PUSCH timing capability 2

| μ | PUSCH preparation time $N_2$ [symbols] |
|---|---|
| 0 | 5 |
| 1 | 5.5 |
| 2 | 11 for frequency range 1 |

Figure 7:
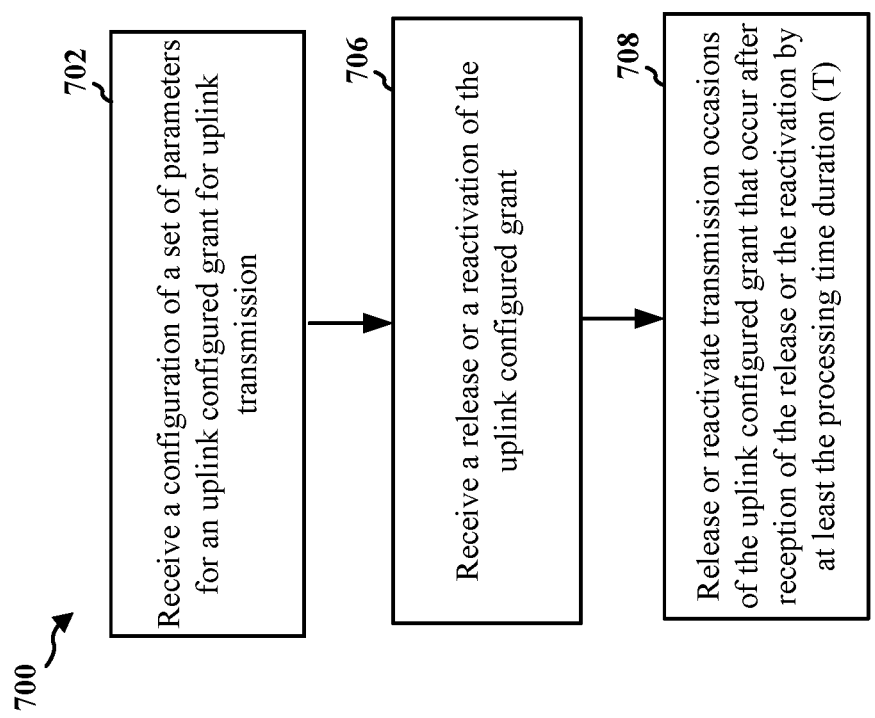
FIG. 7 is a flowchart of a method of wireless communication.

FIG. 7 is a flowchart 700 of a method of wireless communication. The method may be performed by a UE (e.g., the UE 104, 350, 402, the apparatus 1102). The method provides a timeline for the UE to apply a reactivation or release of the periodic resources based on a processing time duration following the signaling of the reactivation or release. The timeline helps to avoid miscommunication between the UE and the base station.

At 702, the UE receives a configuration of a set of parameters for an uplink configured grant for uplink transmission. The uplink transmission may comprise a PUSCH, for example. The configuration of the set of parameters for the uplink configured grant may be received in an RRC message, for example. The uplink configured grant may comprise a Type 2 uplink configured grant. An example of a configuration and an activation are described in connection with FIG. 4. The reception may be performed, e.g., by the ULCG component 1140 via the reception component 1130 and/or the cellular RF transceiver 1122 of the apparatus 1102 in FIG. 11.

In some aspect, the UE may determine a processing time duration (e.g., T). The UE may determine the processing time duration based on a PUSCH time (e.g., $N_2$). The UE may determine the processing time duration based on a PUSCH preparation procedure time for a type of PUSCH timing capability. The UE may determine the processing time duration based on the PUSCH preparation procedure time for a type 2 PUSCH timing capability (e.g., $T_{proc,2}$). The determination may be performed, e.g., by the processing time duration component 1142 of the apparatus 1102 in FIG. 11.

At 706, the UE receives a release or a reactivation of the uplink configured grant. The release or the reactivation may be received in a PDCCH (e.g., DCI), where the processing time duration is measured from an end of the PDCCH in which release or the reactivation is received. The release/reactivation may be received, e.g., by the ULCG component 1140 via the reception component 1130 and/or the cellular RF transceiver 1122 of the apparatus 1102 in FIG. 11.

At 708, the UE releases or reactivates transmission occasions of the uplink configured grant that occur after reception of the release or the reactivation by at least the processing time duration. The release or reactivation may be applied, e.g., by the release/activation component 1144 based on the time duration from the processing time duration component 1142 of the apparatus 1102 in FIG. 11. For example, the UE may not apply the release or the reactivation to a transmission occasion of the uplink configured grant that occurs within the processing time duration following the release or the reactivation. The transmission occasion of the uplink configured grant may occur within the processing time duration based on an earliest starting symbol of the transmission occasion occurring within the processing time duration.

The release or the reactivation may comprise a joint indication for a plurality of uplink configured grants, and wherein the UE applies the joint indication separately to each of the plurality of uplink configured grants based on whether a transmission occasion of a corresponding uplink configured grant occurs within the processing time duration.

Figure 8:
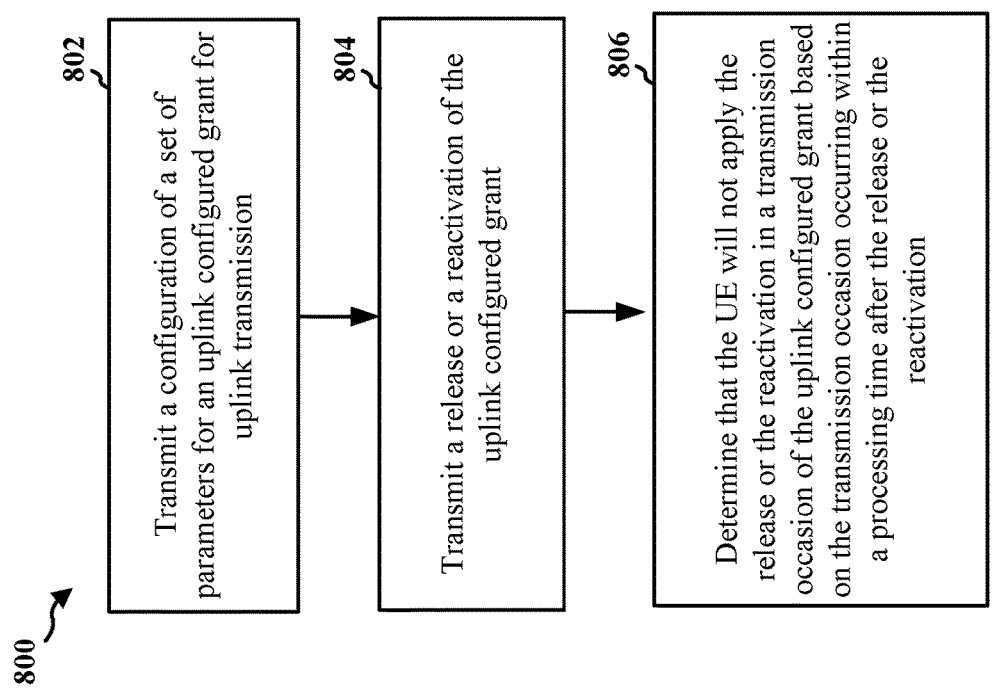
FIG. 8 is a flowchart of a method of wireless communication.

FIG. 8 is a flowchart 800 of a method of wireless communication. The method may be performed by a base station (e.g., the base station 102, 180, 310, 404, the apparatus 1202). The method provides a timeline for reactivation or release of the periodic resources with a UE based on a processing time duration following the signaling of the reactivation or release. The timeline helps to avoid miscommunication between the UE and the base station.

At 802, the base station transmits a configuration of a set of parameters for an uplink configured grant for uplink transmission. The uplink transmission may comprise a PUSCH, for example. The configuration of the set of parameters for the uplink configured grant may be transmitted in an RRC message, for example. The uplink configured grant may comprise a Type 2 uplink configured grant. An example of a configuration and an activation are described in connection with FIG. 4. The transmission may be performed, e.g., by the ULCG component 1240 via the transmission component 1234 and/or the transceiver 1222 of the apparatus 1202 in FIG. 12.

At 804, the base station transmits a release or a reactivation of the uplink configured grant. The release or the reactivation may be transmitted in a PDCCH (e.g., DCI). An example of a release/reactivation is described in connection with FIG. 4. The transmission may be performed, e.g., by the ULCG component 1240 via the transmission component 1234 and/or the transceiver 1222 of the apparatus 1202 in FIG. 12.

At 806, the base station determines that the UE will not apply the release or the reactivation in a transmission occasion of the uplink configured grant based on the transmission occasion occurring within a processing time after the release or the reactivation. The determination may be performed, e.g., by the detection component 1246 of the apparatus 1202 in FIG. 12. The base station may expect the UE to release or reactivate transmission occasions of the uplink configured grant that occur after reception of the release or the reactivation by at least the processing time duration. The base station may determine the processing time duration, e.g., based on a PUSCH time (e.g., $N_2$) and/or a PUSCH preparation procedure time for a type of PUSCH timing capability. The processing time duration may be based on the PUSCH preparation procedure time for a type 2 PUSCH timing capability (e.g., $T_{proc,2}$). The processing time duration is measured from an end of the PDCCH in which release or the reactivation is transmitted by the base station or received by the UE. The base station may monitor for an uplink transmission in a second transmission occasion that occurs at least the processing time following the reactivation. The base station may skip monitoring for the uplink transmission in the second transmission occasion that occurs at least the processing time following the release. For example, the base station may determine that the UE will apply the release/reactivation to the second transmission occasion based on the UE reception of the release/reactivation PDCCH based on the second transmission occasion occurring after the release/reactivation by at least the processing time.

For example, the base station may not expect the UE to apply the release or the reactivation to a transmission occasion of the uplink configured grant that occurs within the processing time duration following the release or the reactivation. The transmission occasion of the uplink configured grant may occur within the processing time duration based on an earliest starting symbol of the transmission occasion occurring within the processing time duration.

The release or the reactivation may comprise a joint indication for a plurality of uplink configured grants, and wherein the base station may expect the UE to apply the joint indication separately to each of the plurality of uplink configured grants based on whether a transmission occasion of a corresponding uplink configured grant occurs within the processing time duration.

Figure 9:
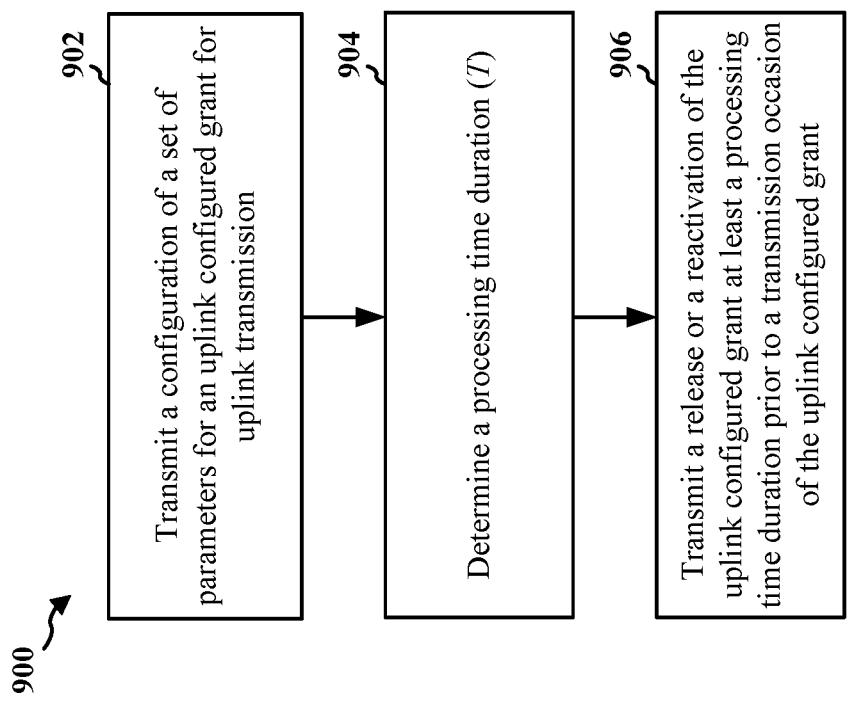
FIG. 9 is a flowchart of a method of wireless communication.

FIG. 9 is a flowchart 900 of a method of wireless communication. The method may be performed by a base station (e.g., the base station 102, 180, 310, 404, the apparatus 1202). The method provides a timeline for reactivation or release of the periodic resources with a UE based on a processing time duration following the signaling of the reactivation or release. The timeline helps to avoid miscommunication between the UE and the base station.

At 902, the base station transmits, to a UE, a configuration of a set of parameters for an uplink configured grant for uplink transmission. The uplink transmission may comprise a PUSCH, for example. The configuration of the set of parameters for the uplink configured grant may be transmitted in an RRC message, for example. The uplink configured grant may comprise a Type 2 uplink configured grant. An example of a configuration and an activation are described in connection with FIG. 4. The transmission may be performed, e.g., by the ULCG component 1240 via the transmission component 1234 and/or the transceiver 1222 of the apparatus 1202 in FIG. 12.

In some aspects, the base station may determine a processing time duration. The base station may determine the processing time duration, e.g., based on a PUSCH time (e.g., $N_2$) and/or a PUSCH preparation procedure time for a type of PUSCH timing capability. The processing time duration may be based on the PUSCH preparation procedure time for a type 2 PUSCH timing capability (e.g., $T_{proc,2}$). The processing time duration is measured from an end of the PDCCH in which release or the reactivation is transmitted by the base station or received by the UE. The determination may be performed, e.g., by the processing time duration component 1242 of the apparatus 1202 in FIG. 12.

At 906, the base station transmits a release or a reactivation of the uplink configured grant at least a processing time duration prior to a transmission occasion of the uplink configured grant. The release or the reactivation may be transmitted in a PDCCH (e.g., DCI). The release or the reactivation may comprise a joint indication for a plurality of uplink configured grants, and the base station may transmit the release or the reactivation of the uplink configured grant at least the processing time duration prior to a next transmission occasion of the each of the plurality of uplink configured grants. An example of a release/reactivation is described in connection with FIG. 4. The transmission may be performed, e.g., by the ULCG component 1240 via the transmission component 1234 and/or the transceiver 1222 of the apparatus 1202 in FIG. 12.

The base station may determine that the UE did not correctly receive the release or the reactivation if the base station receives the uplink transmission in the transmission occasion of the uplink configured grant. The determination may be performed, e.g., by the detection component 1246 of the apparatus 1202, e.g., as described in connection with FIGS. 8 and/or 4.

Figure 10:
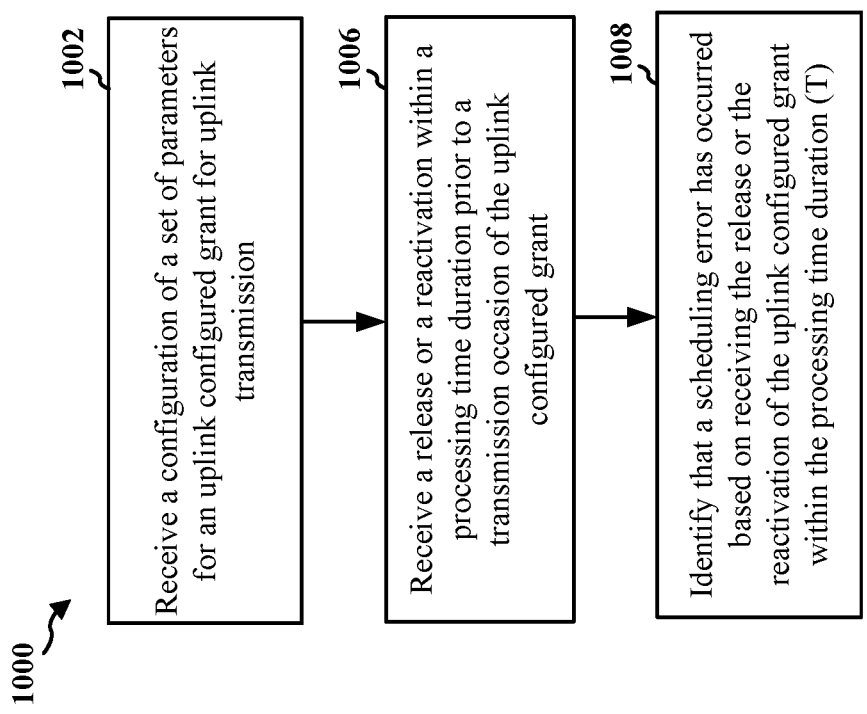
FIG. 10 is a flowchart of a method of wireless communication.

FIG. 10 is a flowchart 1000 of a method of wireless communication. The method may be performed by a UE (e.g., the UE 104, 350, 402, the apparatus 1102). The method provides a timeline for reactivation or release of the periodic resources for a UE based on a processing time duration following the signaling of the reactivation or release. The timeline helps to avoid miscommunication between the UE and the base station.

At 1002, the UE receives a configuration of a set of parameters for an uplink configured grant for uplink transmission. The uplink transmission may comprise a PUSCH, for example. The configuration of the set of parameters for the uplink configured grant may be received in an RRC message, for example. The uplink configured grant may comprise a Type 2 uplink configured grant. An example of a configuration is described in connection with FIG. 4. The reception may be performed, e.g., by the ULCG component 1140 via the reception component 1130 and/or the cellular RF transceiver 1122 of the apparatus 1102 in FIG. 11.

In some aspects, the UE may determine a processing time duration. The UE may determine the processing time duration based on a PUSCH time (e.g., $N_2$). The UE may determine the processing time duration based on a PUSCH preparation procedure time for a type of PUSCH timing capability. The UE may determine the processing time duration based on the PUSCH preparation procedure time for a type 2 PUSCH timing capability (e.g., $T_{proc,2}$). The determination may be performed, e.g., by the processing time duration component 1142 of the apparatus 1102 in FIG. 11.

At 1006, the UE receives a release or a reactivation of the uplink configured grant within a processing time duration prior to a transmission occasion of the uplink configured grant. The release or the reactivation may be received in a PDCCH (e.g., DCI), where the processing time duration is measured from an end of the PDCCH in which release or the reactivation is received. The release or the reactivation may comprise a joint indication for a plurality of uplink configured grants. An example of a release/reactivation is described in connection with FIG. 4. The reception may be performed, e.g., by the ULCG component 1140 via the reception component 1130 and/or the cellular RF transceiver 1122 of the apparatus 1102 in FIG. 11.

At 1008, the UE may identify that a scheduling error has occurred based on receiving the release or the reactivation of the uplink configured grant within the processing time duration. The identification of the scheduling error may be performed, e.g., by the scheduling error component 1146 of the apparatus 1102 based on a time at which the release or reactivation is received and a transmission occasion to which the release/reactivation is applicable. If the time between the release/reactivation and the transmission occasion is less than the processing time duration (e.g., T), the UE may identify the scheduling error. If the time is more than T, the UE may determine that a scheduling error has not occurred.

Figure 11:
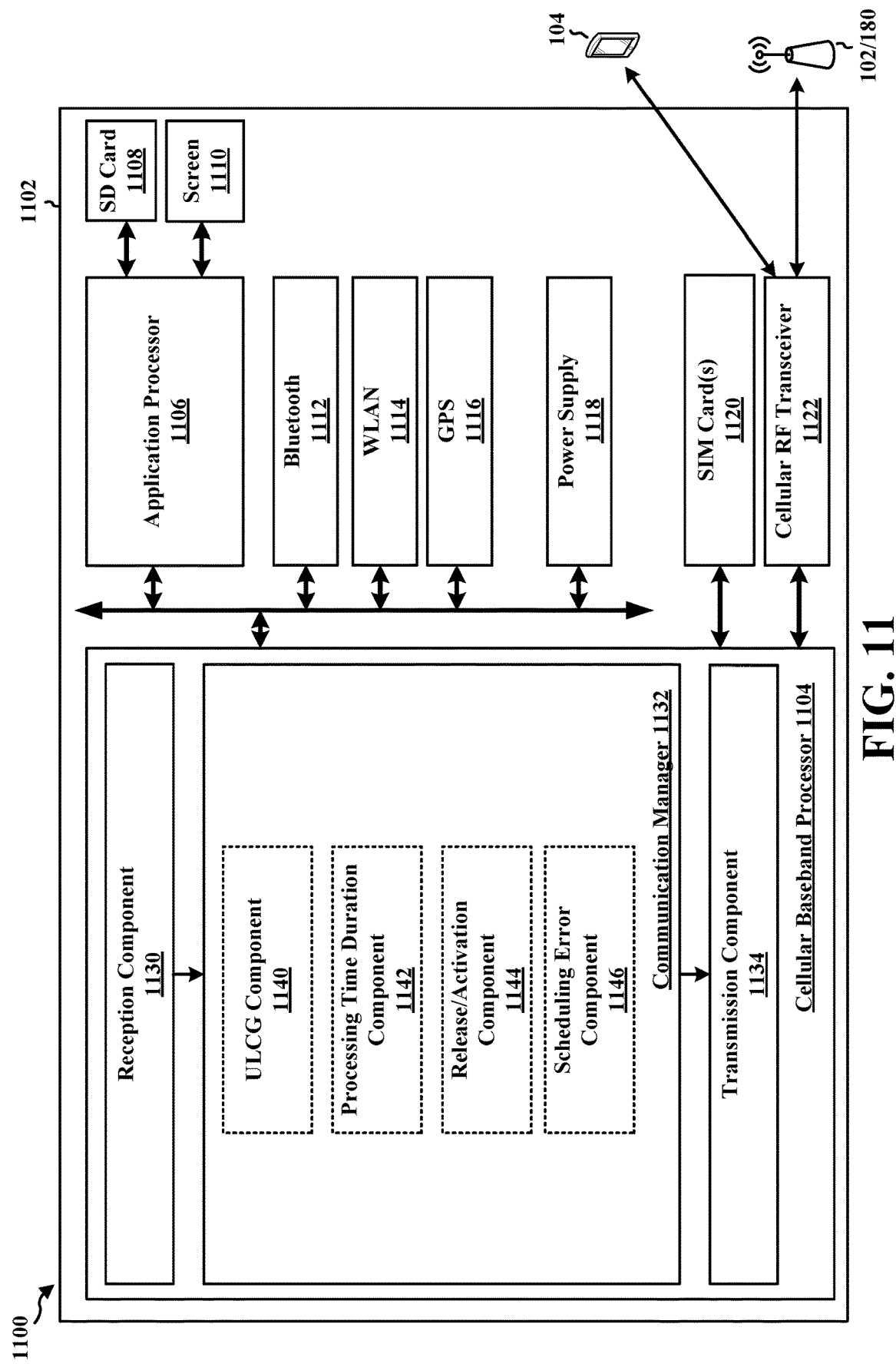
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the cellular baseband processor 1104, and in another configuration, the apparatus 1102 may be the entire UE (e.g., see 350 of FIG. 3) and include the additional modules of the apparatus 1102.

The communication manager 1132 includes an ULCG component 1140 that is configured to receive a configuration of a set of parameters for an uplink configured grant for uplink transmission, e.g., as described in connection with 702 and/or 1002. The ULCG component 1140 is further configured to receive a release or a reactivation, e.g., as described in connection with 704 and/or 1004. The communication manager 1132 further includes a processing time duration component 1142 that is configured to determine a processing time duration, e.g., as described in connection with FIG. 7 or 10. The communication manager 1132 further includes a release/activation component 1144 that is configured to release or reactivate the uplink configured grant that occurs after reception of the release or the reactivation by at least the processing time duration (T), e.g., as described in connection with 708. The communication manager 1132 further includes a scheduling error component 1146 that is configured identify that a scheduling error has occurred based on receiving the release or the reactivation of the uplink configured grant within the processing time duration, e.g., as described in connection with 1008.

The apparatus may include additional components that perform each of the blocks of the algorithm in the flowcharts of FIGS. 7 and/or 10, and/or the aspects performed by the UE 402 in FIG. 4. As such, each block in the flowcharts of FIGS. 7 and/or 10, and/or the aspects performed by the UE 402 in FIG. 4, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving a configuration of a set of parameters for an uplink configured grant for uplink transmission. The apparatus 1102 may further include means for receiving a release or a reactivation of the uplink configured grant and means for releasing or reactivating transmission occasions of the uplink configured grant that occur after reception of the release or the reactivation by at least the processing time duration. The apparatus 1102 may further include means for determining a processing time duration. The apparatus 1102 may further include means for receiving a release or a reactivation of the uplink configured grant within a processing time duration prior to a transmission occasion of the uplink configured grant means for identifying that a scheduling error has occurred based on receiving the release or the reactivation of the uplink configured grant within the processing time duration. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
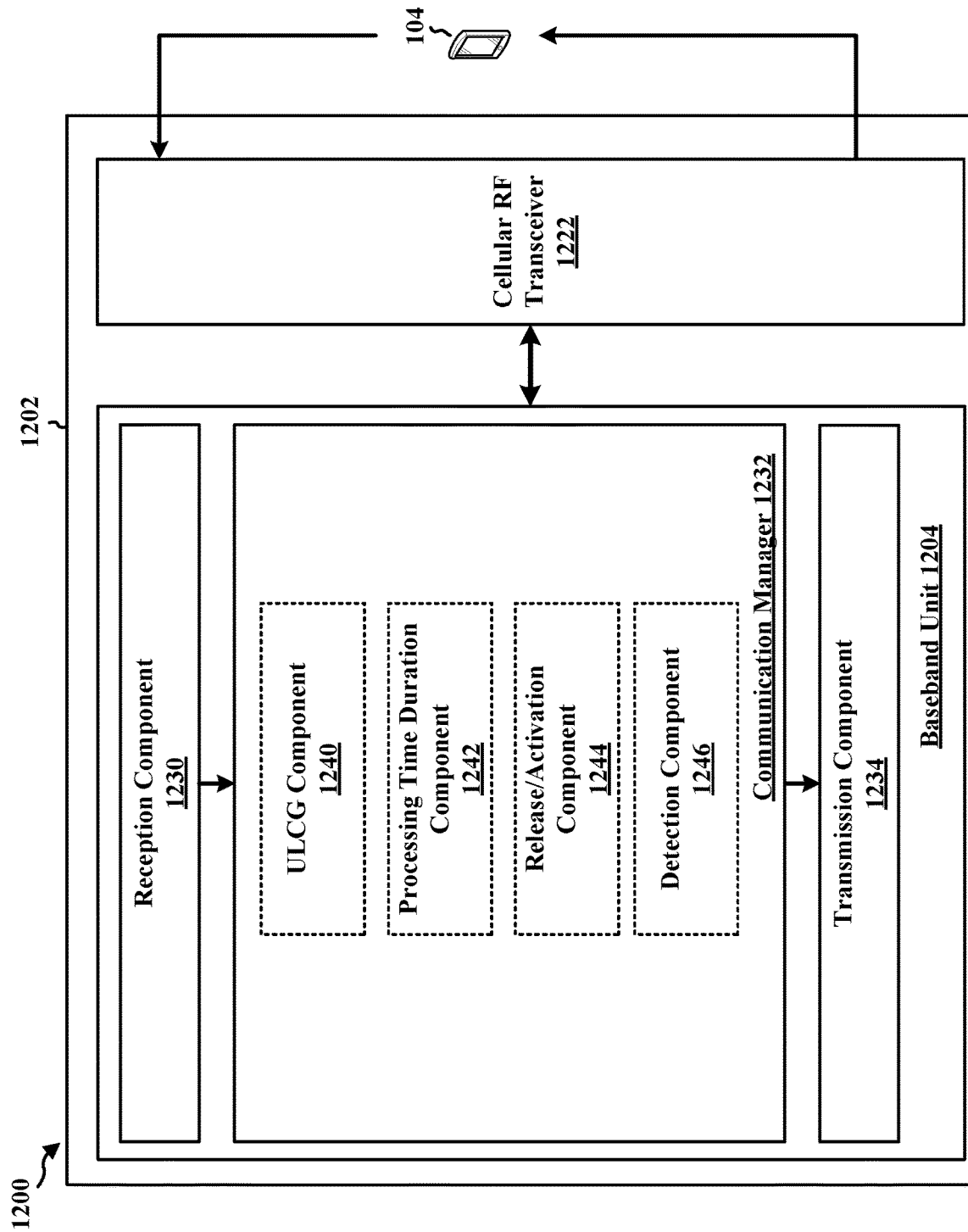
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a transceiver 1222, which may be a cellular RF transceiver, with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a ULCG component 1240 that is configured to transmit a configuration of a set of parameters for an uplink configured grant for uplink transmission, e.g., as described in connection with 802 and/or 902. The ULCG component 1240 may be further configured to transmit a release or a reactivation, e.g., as described in connection with 804 and/or 904. The communication manager 1232 further includes a processing time duration component 1242 that is configured to determine a processing time duration, e.g., as described in connection with FIG. 8 or 9. The communication manager 1232 further includes a release/reactivation component 1244 that is configured to transmit a release or a reactivation of the uplink configured grant at least a processing time duration prior to a transmission occasion of the uplink configured grant, e.g., as described in connection with 906. The communication manager 1232 further includes a detection component 1246 that is configured to determine that the UE will not apply the release or the reactivation in a transmission occasion of the uplink configured grant based on the transmission occasion occurring within a processing time after the release or the reactivation. The detection component 1246 may be configured to determine that the UE failed to receive the release or the reactivation based on receiving the uplink transmission from the UE in a transmission occasion of the uplink configured grant based on the transmission occasion occurring after the release or the reactivation by at least a processing time duration.

The apparatus may include additional components that perform each of the blocks of the algorithm in the flowcharts of FIGS. 8 and/or 9, as well as the aspects performed by the base station 404 in FIG. 4. As such, each block in the flowcharts of FIGS. 8 and/or 9, as well as the aspects performed by the base station 404 in FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting, to a UE, a configuration of a set of parameters for an uplink configured grant for uplink transmission. The apparatus 1202 may further include means for transmitting a release or a reactivation of the uplink configured grant; and means for determining that the UE failed to receive the release or the reactivation based on receiving the uplink transmission from the UE in a transmission occasion of the uplink configured grant based on the transmission occasion occurring after the release or the reactivation by at least a processing time duration. The apparatus 1202 may further include means for determining that the UE did not correctly receive the release or the reactivation if the base station receives the uplink transmission in the transmission occasion of the uplink configured grant. The apparatus 1202 may further include means for transmitting a release or a reactivation of the uplink configured grant at least a processing time duration prior to a transmission occasion of the uplink configured grant. The apparatus 1202 may further include means for determining a processing time duration. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example aspects are illustrative only and may be combined with aspects of other examples or teachings described herein, without limitation.

Aspect 1 is a method of wireless communication at a UE, comprising: receiving a configuration of a set of parameters for an uplink configured grant for uplink transmission; receiving a release or a reactivation of the uplink configured grant; and releasing or reactivating transmission occasions of the uplink configured grant that occur after reception of the release or the reactivation by at least a processing time duration.

In aspect 2, the method of aspect 1 further includes skipping application of the release or the reactivation to a transmission occasion of the uplink configured grant that occurs within the processing time duration following the release or the reactivation.

In aspect 3, the method of aspect 2 further includes that the transmission occasion of the uplink configured grant occurs within the processing time duration based on an earliest starting symbol of the transmission occasion occurring within the processing time duration.

In aspect 4, the method of any of aspects 1-3 further includes that the uplink transmission comprises a PUSCH.

In aspect 5, the method of any of aspects 1-4 further includes that the UE receives the configuration of the set of parameters for the uplink configured grant in a RRC message and receives the release or the reactivation in a PDCCH, wherein the processing time duration is measured from an end of the PDCCH in which the release or the reactivation is received.

In aspect 6, the method of any of aspects 1-5 further includes that the uplink configured grant comprises a Type 2 uplink configured grant.

In aspect 7, the method of any of aspects 1-6 further includes that the release or the reactivation comprises a joint indication for a plurality of uplink configured grants, and the UE applies the joint indication separately to each of the plurality of uplink configured grants based on whether a transmission occasion of a corresponding uplink configured grant occurs within the processing time duration.

In aspect 8, the method of any of aspects 1-7 further includes that the processing time duration is based on a PUSCH preparation time.

In aspect 9, the method of any of aspects 1-8 further includes that the processing time duration is based on a PUSCH preparation procedure time for a type of PUSCH timing capability.

In aspect 10, the method of any of aspects 1-8 further includes that the processing time duration is based on the PUSCH preparation procedure time for a type 2 PUSCH timing capability (Tproc,2).

Aspect 11 is an apparatus for wireless communication comprising memory and at least one processor coupled to the memory, the memory and the at least one processor being configured to perform the method of any of aspects 1-10.

In aspect 12, the apparatus of aspect 10 further includes at least one antenna and a transceiver coupled to the at least one antenna and the at least one processor.

Aspect 13 is an apparatus for wireless communication comprising means to perform the method of any of aspects 1-10.

In aspect 14, the apparatus of aspect 13 further includes at least one antenna and a transceiver coupled to the at least one antenna and the at least one processor.

Aspect 15 is a non-transitory computer readable medium storing instructions executable by one or more processors to cause the one or more processors to implement a method as in any of aspects 1-10.

Aspect 16 is a method of wireless communication at a base station, comprising: transmitting, to a UE, a configuration of a set of parameters for an uplink configured grant for uplink transmission; transmitting a release or a reactivation of the uplink configured grant; and determining that the UE will not apply the release or the reactivation in a transmission occasion of the uplink configured grant based on the transmission occasion occurring within a processing time after the release or the reactivation.

In aspect 17, the method of aspect 16 further includes monitoring for an uplink transmission in a second transmission occasion that occurs at least the processing time following the reactivation.

In aspect 18, the method of aspect 16 further includes skipping monitoring for the uplink transmission in the second transmission occasion that occurs at least the processing time following the release.

In aspect 19, the method of any of aspects 16-18 further includes that the transmission occasion of the uplink configured grant occurs within the processing time duration based on at an earliest starting symbol of the transmission occasion occurring within the processing time duration.

In aspect 20, the method of any of aspects 16-19 further includes that the uplink transmission comprises a PUSCH.

In aspect 21, the method of any of aspects 16-20 further includes transmitting the configuration of the set of parameters for the uplink configured grant in a RRC message and transmitting the release or the reactivation in DCI.

In aspect 22, the method of any of aspects 16-21 further includes that the processing time duration is based on a PUSCH preparation time.

In aspect 23, the method of any of aspects 16-22 further includes that the processing time duration is based on a PUSCH preparation procedure time for a type of PUSCH timing capability.

In aspect 24, the method of any of aspects 16-23 further includes that the processing time duration is based on the PUSCH preparation procedure time for a type 2 PUSCH timing capability (Tproc,2).

Aspect 25 is an apparatus for wireless communication comprising memory and at least one processor coupled to the memory, the memory and the at least one processor being configured to perform the method of any of aspects 16-24.

In aspect 26, the apparatus of aspect 25 further includes at least one antenna and a transceiver coupled to the at least one antenna and the at least one processor.

Aspect 27 is an apparatus for wireless communication comprising means to perform the method of any of aspects 16-24.

In aspect 28, the apparatus of aspect 27 further includes at least one antenna and a transceiver coupled to the at least one antenna and the at least one processor.

Aspect 29 is a non-transitory computer readable medium storing instructions executable by one or more processors to cause the one or more processors to implement a method as in any of aspects 16-24.

Aspect 30 is a method of wireless communication at a base station, comprising: transmitting, to a UE, a configuration of a set of parameters for an uplink configured grant for uplink transmission; and transmitting a release or a reactivation of the uplink configured grant at least a processing time duration prior to a transmission occasion of the uplink configured grant.

In aspect 31, the method of aspect 30 further includes that the uplink transmission comprises a PUSCH.

In aspect 32, the method of aspect 30 or 31 further includes that the release or the reactivation comprises a joint indication for a plurality of uplink configured grants, the method further comprising transmitting the release or the reactivation of the uplink configured grant at least the processing time duration prior to a next transmission occasion of each of the plurality of uplink configured grants.

In aspect 33, the method of any of aspects 30-32 further includes that the processing time duration is based on a PUSCH preparation time.

In aspect 34, the method of any of aspects 30-33 further includes that the processing time duration is based on a PUSCH preparation procedure time for a type of PUSCH timing capability.

In aspect 35, the method of any of aspects 30-34 further includes that the processing time duration is based on the PUSCH preparation procedure time for a type 2 PUSCH timing capability (Tproc,2).

Aspect 36 is an apparatus for wireless communication comprising memory and at least one processor coupled to the memory, the memory and the at least one processor being configured to perform the method of any of aspects 30-35.

In aspect 37, the apparatus of aspect 36 further includes at least one antenna and a transceiver coupled to the at least one antenna and the at least one processor.

Aspect 38 is an apparatus for wireless communication comprising means to perform the method of any of aspects 30-35.

In aspect 39, the apparatus of aspect 38 further includes at least one antenna and a transceiver coupled to the at least one antenna and the at least one processor.

Aspect 40 is a non-transitory computer readable medium storing instructions executable by one or more processors to cause the one or more processors to implement a method as in any of aspects 30-35.

Aspect 41 is a method of wireless communication at a UE, comprising: receiving a configuration of a set of parameters for an uplink configured grant for uplink transmission; receiving a release or a reactivation of the uplink configured grant within a processing time duration prior to a transmission occasion of the uplink configured grant; and identifying that a scheduling error has occurred based on receiving the release or the reactivation of the uplink configured grant within the processing time duration.

In aspect 42, the method of aspect 41 further includes that the uplink transmission comprises a PUSCH.

In aspect 43, the method of aspect 41 or 42 further includes that the UE receives the configuration of the set of parameters for the uplink configured grant in a RRC message and receives the release or the reactivation in DCI.

In aspect 44, the method of any of aspects 41-43 further includes that the release or the reactivation comprises a joint indication for a plurality of uplink configured grants.

In aspect 45, the method of any of aspects 41-44 further includes that the processing time duration is based on a PUSCH preparation time.

In aspect 46, the method of any of aspects 41-45 further includes that the processing time duration is based on a PUSCH preparation procedure time for a type of PUSCH timing capability.

In aspect 47, the method of any of aspects 41-46 further includes that the processing time duration is based on the PUSCH preparation procedure time for a type 2 PUSCH timing capability (Tproc,2).

Aspect 48 is an apparatus for wireless communication comprising memory and at least one processor coupled to the memory, the memory and the at least one processor being configured to perform the method of any of aspects 41-47.

In aspect 49, the apparatus of aspect 48 further includes at least one antenna and a transceiver coupled to the at least one antenna and the at least one processor.

Aspect 50 is an apparatus for wireless communication comprising means to perform the method of any of aspects 41-47.

In aspect 51, the apparatus of aspect 50 further includes at least one antenna and a transceiver coupled to the at least one antenna and the at least one processor.

Aspect 52 is a non-transitory computer readable medium storing instructions executable by one or more processors to cause the one or more processors to implement a method as in any of aspects 41-47.

What is claimed is:

1. An apparatus for wireless communication at a user equipment (UE), comprising:
   memory; and
   at least one processor coupled to the memory and configured to:
   receive a configuration of a set of parameters for an uplink configured grant for uplink transmission, wherein the set of parameters configures periodic transmission occasions;
   receive a release or a reactivation of the uplink configured grant, the release indicating for the UE to stop using the set of parameters of the uplink configured grant, and the reactivation indicating for the UE to resume use of the set of parameters of the uplink configured grant; and
   release or reactivate transmission occasions of the uplink configured grant that occur after reception of the release or the reactivation by at least a processing time duration.

2. The apparatus of claim 1, wherein the at least one processor is further configured to:
   skip application of the set of parameters of the uplink configured grant for a transmission occasion of the uplink configured grant that occurs within the processing time duration following the reactivation, and
   transmit, based on the reception of the reactivation, using the set of parameters of the uplink configured grant in one or more transmission occasions after the processing time duration has elapsed following the reception of the reactivation.

3. The apparatus of claim 2, wherein the transmission occasion of the uplink configured grant occurs within the processing time duration based on an earliest starting symbol of the transmission occasion occurring within the processing time duration.

4. The apparatus of claim 1, wherein the uplink transmission comprises a physical uplink shared channel (PUSCH).

5. The apparatus of claim 1, wherein the at least one processor is configured to receive the configuration of the set of parameters for the uplink configured grant in a radio resource control (RRC) message and to receive the release or the reactivation in a physical downlink control channel (PDCCH), wherein the processing time duration is measured from an end of the PDCCH in which the release or the reactivation is received.

6. The apparatus of claim 1, wherein the uplink configured grant comprises a Type 2 uplink configured grant.

7. The apparatus of claim 1, wherein the release or the reactivation comprises a joint indication for a plurality of uplink configured grants, and wherein the at least one processor is configured to apply the joint indication separately to each of the plurality of uplink configured grants based on whether a transmission occasion of a corresponding uplink configured grant occurs within the processing time duration.

8. The apparatus of claim 1, wherein the processing time duration is based on a physical uplink shared channel (PUSCH) preparation time.

9. The apparatus of claim 1, wherein the processing time duration is based on a physical uplink shared channel (PUSCH) preparation procedure time for a type of PUSCH timing capability.

10. The apparatus of claim 1, further comprising:
at least one antenna; and
a transceiver coupled to the at least one antenna and the at least one processor.

11. The apparatus of claim 1, wherein the at least one processor is further configured to:
continue to use the set of parameters of the uplink configured grant that occur during the processing time duration after the reception of the release; and
stop using the set of parameters of the uplink configured grant for the periodic transmission occasions after the processing time duration following the reception of the release.

12. The apparatus of claim 1, wherein the at least one processor is further configured to:
skip transmission in at least one of the periodic transmission occasions of the uplink configured grant that occurs after the processing time duration following the release; and
transmit in one or more later transmission occasions of the uplink configured grant that occur after the processing time duration has elapsed following the reactivation.

13. An apparatus for wireless communication at a base station, comprising:
memory; and
at least one processor coupled to the memory and configured to:
transmit, to a user equipment (UE), a configuration of a set of parameters for an uplink configured grant for uplink transmission, wherein the set of parameters configures periodic transmission occasions; and
transmit a release or a reactivation of the uplink configured grant, the release indicating for the UE to stop using the set of parameters of the uplink configured grant, and the reactivation indicating for the UE to resume use of the set of parameters of the uplink configured grant;
wherein no uplink transmission is received from the UE in a transmission occasion of the uplink configured grant based on the transmission occasion occurring within a processing time after the release or the reactivation.

14. The apparatus of claim 13, wherein the at least one processor is further configured to:
monitor for the uplink transmission from the UE in a second transmission occasion that occurs at least after a duration of the processing time following the reactivation, or
skip monitoring for the uplink transmission in the second transmission occasion that occurs at least after the duration of the processing time following the release.

15. The apparatus of claim 13, wherein the transmission occasion of the uplink configured grant occurs within a duration of the processing time based on at an earliest starting symbol of the transmission occasion occurring within the duration of the processing time.

16. The apparatus of claim 13, wherein the uplink transmission comprises a physical uplink shared channel (PUSCH).

17. The apparatus of claim 13 wherein the at least one processor is configured to transmit the configuration of the set of parameters for the uplink configured grant in a radio resource control (RRC) message and to transmit the release or the reactivation in dynamic control information (DCI).

18. The apparatus of claim 13, wherein a duration of the processing time is based on a physical uplink shared channel (PUSCH) preparation time.

19. The apparatus of claim 13, wherein a duration of the processing time is based on a physical uplink shared channel (PUSCH) preparation procedure time for a type of PUSCH timing capability.

20. The apparatus of claim 13, further comprising:
at least one antenna; and
a transceiver coupled to the at least one antenna and the at least one processor.

21. An apparatus for wireless communication at a base station, comprising:
memory; and
at least one processor coupled to the memory and configured to:
transmit, to a user equipment (UE), a configuration of a set of parameters for an uplink configured grant for uplink transmission, wherein the set of parameters configures periodic transmission occasions; and
transmit a release or a reactivation of the uplink configured grant at least a processing time duration prior to a transmission occasion of the uplink configured grant, the release indicating for the UE to stop using the set of parameters of the uplink configured grant, and the reactivation indicating for the UE to resume use of the set of parameters of the uplink configured grant.

22. The apparatus of claim 21, wherein the release or the reactivation comprises a joint indication for a plurality of uplink configured grants, and wherein the at least one processor is configured to transmit the release or the reactivation of the uplink configured grant at least the processing time duration prior to a next transmission occasion of each of the plurality of uplink configured grants.

23. The apparatus of claim 21, wherein the processing time duration is based on a physical uplink shared channel (PUSCH) preparation time.

24. The apparatus of claim 21, wherein the processing time duration is based on a physical uplink shared channel (PUSCH) preparation procedure time for a type of PUSCH timing capability.

25. The apparatus of claim 24, wherein the processing time duration is based on the PUSCH preparation procedure time for a type 2 PUSCH timing capability (Tproc,2).

26. The apparatus of claim 21, further comprising:
at least one antenna; and
a transceiver coupled to the at least one antenna and the at least one processor.

27. An apparatus for wireless communication at a user equipment (UE), comprising:
memory; and
at least one processor coupled to the memory and configured to:
receive a configuration of a set of parameters for an uplink configured grant for uplink transmission, wherein the set of parameters configures periodic transmission occasions;

receive a release or a reactivation of the uplink configured grant within a processing time duration prior to a transmission occasion of the uplink configured grant, the release indicating for the UE to stop using the set of parameters of the uplink configured grant, and the reactivation indicating for the UE to resume use of the set of parameters of the uplink configured grant; and identify that a scheduling error has occurred based on receiving the release or the reactivation of the uplink configured grant within the processing time duration.

28. The apparatus of claim 27, wherein the at least one processor is configured to receive the configuration of the set of parameters for the uplink configured grant in a radio resource control (RRC) message and receive the release or the reactivation in dynamic control information (DCI).

29. The apparatus of claim 27, wherein the release or the reactivation comprises a joint indication for a plurality of uplink configured grants.

30. The apparatus of claim 27, wherein the processing time duration is based on a physical uplink shared channel (PUSCH) preparation time.

31. The apparatus of claim 27, wherein the processing time duration is based on a physical uplink shared channel (PUSCH) preparation procedure time for a type of PUSCH timing capability.

32. The apparatus of claim 27, further comprising:
at least one antenna; and
a transceiver coupled to the at least one antenna and the at least one processor.

* * * * *